United States Patent

[11] 3,601,249

[72] Inventor Sven Anders Larsson
3 Frejavaegen 4, Sundbyberg, Sweden
[21] Appl. No. 874,434
[22] Filed Nov. 6, 1969
[45] Patented Aug. 24, 1971
[32] Priority Dec. 16, 1968
[33] Sweden
[31] 17221/1968

[54] CYLINDRICAL STORAGE BOX WITH A LID, FOR DIAPOSITIVES IN RADIALLY ARRANGED COMPARTMENTS
6 Claims, 4 Drawing Figs.

[52] U.S. Cl. .......... 206/1 R, 206/47 R, 220/22, 220/23
[51] Int. Cl. .......... A45c 11/00
[50] Field of Search .......... 220/22, 23; 206/52 F–62 R, 72, 47 R, 59 E; 40/79

[56] References Cited
UNITED STATES PATENTS

| | | | |
|---|---|---|---|
| 1,606,811 | 11/1926 | Schilke | 220/23 X |
| 2,515,703 | 7/1950 | Dumas | 220/23 X |
| 2,802,590 | 8/1957 | Tupper | 220/23 |
| 3,067,867 | 12/1962 | Bonham et al. | 220/23 X |
| 3,218,744 | 11/1965 | Danner | 40/79 |

*Primary Examiner*—M. Henson Wood, Jr.
*Assistant Examiner*—John J. Love
*Attorney*—Sughrue, Rothwell, Mion, Zinn & MacPeak

ABSTRACT: A cylindrical storage box for diapositives arranged in radially directed compartments of the box is provided with a lid or cover. The inner side of the lid facing the compartments is provided with a cylindrical wall coaxial with the lid. The cylindrical wall and the lid form a storage space for at least one magnetic tape reel and is provided with retaining means to detachably retain the reel in the storage space.

CYLINDRICAL STORAGE BOX WITH A LID, FOR DIAPOSITIVES IN RADIALLY ARRANGED COMPARTMENTS

The invention relates to a cylindrical storage box with a lid for diapositives arranged in radial compartments, and particularly to such a box intended for storage of at least one reel of magnetic tape at the same time.

For teaching purposes it is now usual to use diapositive pictures which are explained to the students by playing back an explanatory text recorded on magnetic tape. The diapositives and the magnetic tape have so far been kept in separate boxes, which leads to confusion and requires too much space.

The object of the invention is to effect a storage unit for both the diapositive pictures and the reel of magnetic tape, and also to effect a unit having a volume which does not noticeably exceed that of known boxes containing only the diapositives.

In the known circular magazines there is a relatively large central space which is not used for storage purposes and this space is utilized in the invention for storing one or more superimposed reels of magnetic tape, which are stored in a closed space forming a part of the lid of the cylindrical box.

The essential characteristics of the invention are clear from the claims.

Figure 1:
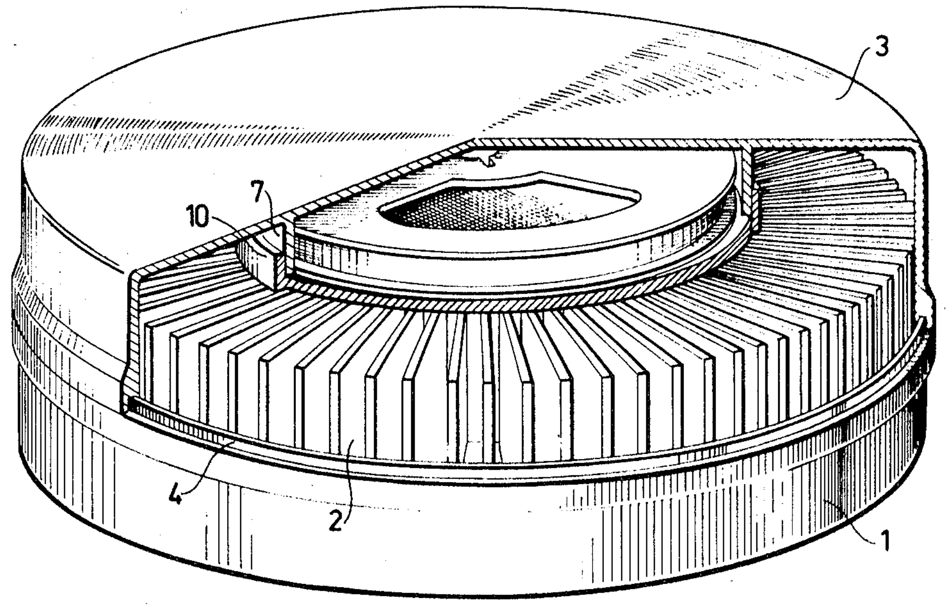
Figure 2:
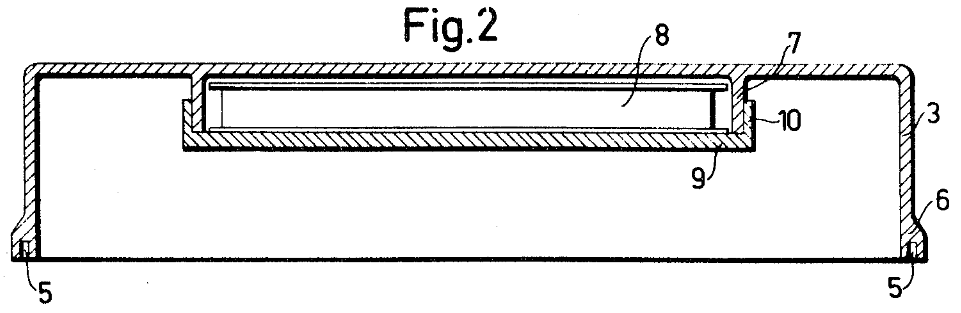
Figure 3:
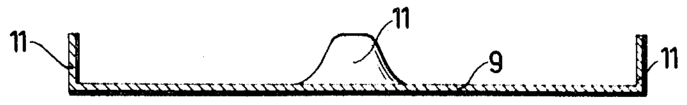
Figure 4:
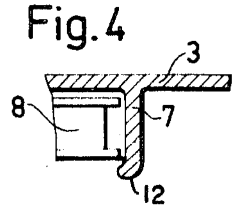

In the accompanying drawings,

FIG. 1 shows a perspective view of storage box according to the invention, partly in section, FIG. 2 shows a section through the lid of the box, taken along the center axis of the lid, FIG. 3 shows a modified embodiment of the covering lid for the reel container and FIG. 4 shows modified members to retain the reel.

In FIG. 1, 1 designates a cylindrical box or a magazine for diapositive pictures. The box 1 is provided with radially directed compartments 2, one for each diapositive. The box 1 is provided with a lid 3 to protect the diapositives in the box 1. The upper edge of the box 1 is provided with a flange 4 which engages in a groove 5 in the lower, collarlike edge 6 of the cylindrical lid 3. On the inside of the lid 3 is a cylindrical wall 7, coaxial with the lid and the box 1. The cylinder described by the wall 7 has a diameter exceeding that of the magnetic tape reel 8 which is stored in the space limited by the wall 7 and the inside of the lid 3. So that the lid 3 can be removed and put back on the box 1 without there being any risk of the reel 8 slipping out of the space enclosed by the wall 7 this space is either provided with a covering lid 9, as shown in FIGS. 1–3, or with other members to retain the reel, for example of the type shown in FIG. 4.

In FIGS. 1 and 2 the reel space is shown provided with a covering lid 9 having a peripheral flange 10 which surrounds the wall 7 under friction and retains the reel 8 in safe storage.

Of course, the flange 10 may be replaced by other suitable retaining members to hold the lid 9 firmly. Thus, FIG. 3 shows the flange replaced by tongues 11 running perpendicular to the plane of the covering lid 9 and being evenly distributed around the circumference of the lid 9. In the same way as the flange 10 in the first embodiment, the tongues 11 grip the wall 7, but they may equally well be arranged to be clamped against the inside of this wall 7. In the latter case, there is preferably a hole in the center of the lid so that a finger can be inserted to remove the lid.

FIG. 4 shows a section of the lid 3 and the wall 7 and the reel 8 is retained in the space by bosses 12 or the like projecting inwardly from the lower edge of the wall 7. When the reel 8 has been pressed down into the space, these bosses snap over the reel and keep it in position. In this embodiment, however, the reel 8 is not protected to the same extent as when a covering lid is used.

It is obvious that other types of members for retaining and protecting the reel in the space within the wall 7 are possible and the invention is therefore only limited by the scope of the claims.

I claim:

1. A storage box assembly, comprising, in combination:
   - a. a circular storage box base,
   - b. a circular, radially compartmented, storage tray within the storage box base containing a supply of diapositives,
   - c. a lid closing the storage box base and including a storage compartment containing a reel of magnetic tape,
   - d. the reel storage compartment comprising a cylindrical wall coaxial with the lid and permanently attached to the inner side thereof facing the compartments, and
   - e. means cooperable with the wall for detachably retaining the reel in the storage compartment.
2. Storage box according to claim 1 wherein said means comprises a covering lid having retaining members which engage with the wall.
3. Storage box according to claim 1, wherein the wall has a height which essentially corresponds to the height of one or more reels inserted in the space.
4. Storage box according to claim 2 wherein the retaining members of the covering lid comprise a flange around the circumference of the covering lid arranged to surround the outside of the wall under friction.
5. Storage box according to claim 2 wherein the retaining members comprise tongues projecting perpendicular to the plane of the covering lid, said tongues being evenly distributed along the circumference of the covering lid and arranged to engage with the wall.
6. Storage box according to claim 1 wherein said means comprises inwardly directed bosses projecting from the wall and arranged to lie over the edge of a reel inserted in the storage compartment, said edge being remote from the inner side of the lid.